US012789514B2

(12) United States Patent
Wang et al.

(10) Patent No.: US 12,789,514 B2
(45) Date of Patent: Nov. 10, 2026

(54) THIN MULTI-LAYER PANELING STRUCTURE

(71) Applicant: Trinseo Europe GmbH, Pfaeffikon (CH)

(72) Inventors: Jing-Han (Helen) Wang, Blue Bell, PA (US); Brian Cromer, Compiegne (FR)

(73) Assignee: Trinseo Europe GmbH, Pfaeffikon (CH)

( * ) Notice: Subject to any disclaimer, the term of this patent is extended or adjusted under 35 U.S.C. 154(b) by 217 days.

(21) Appl. No.: 18/743,407

(22) Filed: Jun. 14, 2024

(65) Prior Publication Data

US 2025/0042142 A1 Feb. 6, 2025

Related U.S. Application Data

(63) Continuation of application No. 17/609,942, filed as application No. PCT/US2020/032776 on May 14, 2020, now abandoned.

(60) Provisional application No. 62/849,333, filed on May 17, 2019.

(51) Int. Cl.

| | |
|---|---|
| ***B32B 27/08*** | (2006.01) |
| ***B32B 7/12*** | (2006.01) |
| ***B32B 9/00*** | (2006.01) |
| ***B32B 9/04*** | (2006.01) |
| ***B32B 15/08*** | (2006.01) |
| ***B32B 25/08*** | (2006.01) |
| ***B32B 27/20*** | (2006.01) |
| ***B32B 27/28*** | (2006.01) |
| ***B32B 27/30*** | (2006.01) |
| ***B32B 27/32*** | (2006.01) |
| ***B32B 27/34*** | (2006.01) |
| ***B32B 27/36*** | (2006.01) |
| ***B32B 27/40*** | (2006.01) |

(52) U.S. Cl.

CPC ................ *B32B 27/08* (2013.01); *B32B 7/12* (2013.01); *B32B 9/005* (2013.01); *B32B 9/045* (2013.01); *B32B 15/08* (2013.01); *B32B 25/08* (2013.01); *B32B 27/20* (2013.01); *B32B 27/281* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 2250/40* (2013.01); *B32B 2260/021* (2013.01); *B32B 2260/046* (2013.01); *B32B 2264/1021* (2020.08); *B32B 2264/1023* (2020.08); *B32B 2264/1025* (2020.08); *B32B 2264/104* (2013.01); *B32B 2264/108* (2013.01); *B32B 2274/00* (2013.01); *B32B 2307/406* (2013.01); *B32B 2307/558* (2013.01); *B32B 2307/584* (2013.01); *B32B 2307/714* (2013.01); *B32B 2307/732* (2013.01); *B32B 2479/00* (2013.01); *B32B 2509/00* (2013.01); *B32B 2605/003* (2013.01); *B32B 2605/08* (2013.01); *B32B 2605/12* (2013.01); *B32B 2605/18* (2013.01)

(58) Field of Classification Search

CPC .................................................... B32B 27/308

See application file for complete search history.

(56) References Cited

U.S. PATENT DOCUMENTS

| | | | | |
|---|---|---|---|---|
| 5,322,899 | A | 6/1994 | Grunewalder et al. | |
| 5,975,625 | A | 11/1999 | Simplicean | |
| 6,852,405 | B2 | 2/2005 | Wanat et al. | |
| 7,357,988 | B2 | 4/2008 | Howie | |
| 7,413,624 | B2 | 8/2008 | Dhawan et al. | |
| 8,324,318 | B2 | 12/2012 | DeRudder | |
| 9,096,760 | B2 | 8/2015 | Gallucci et al. | |
| 10,196,485 | B2 | 2/2019 | Zhou et al. | |
| 2005/0186393 | A1 * | 8/2005 | Wilson | B32B 27/20 428/141 |
| 2008/0242782 | A1 | 10/2008 | Hager et al. | |
| 2009/0280252 | A1 | 11/2009 | Armstrong et al. | |
| 2015/0352818 | A1 | 12/2015 | Glotin et al. | |
| 2017/0036428 | A1 | 2/2017 | Richards et al. | |
| 2019/0106558 | A1 | 4/2019 | Dias et al. | |
| 2021/0355294 | A1 | 11/2021 | Crabb et al. | |
| 2022/0212454 | A1 | 7/2022 | Wang et al. | |

FOREIGN PATENT DOCUMENTS

| | | |
|---|---|---|
| KR | 20100050874 A | 5/2010 |

OTHER PUBLICATIONS

International Search Report for International Application No. PCT/US2020/032776, dated Aug. 3, 2020, 2 pages.
Second Office Action issued in co-pending Application No. CN202080036784.7 dated Dec. 26, 2024, with English translation (7 pages).
Technical Product Data Sheet and Technical Information for the ABS Raw Material "LUSTRAN 552 ABS".
Technical Product Data Sheets for the PMMA raw material "Acry-Lite 8H" by Rohm, and for the HI-PMMA raw material "Plexiglas HFI10-101" by Altuglas.
Senoplast Technical Product Data Sheet.

* cited by examiner

*Primary Examiner* — Zachary M Davis

(57) ABSTRACT

The invention relates to a multi-layer paneling structure having a high gloss cap and second layer of high impact resistance thermoplastic polymer or composites for exterior and interior paneling applications where chemical resistance and/or scratch resistance is desired. The invention also relates to a high gloss, multi-layer panel that can easily be repaired, once marred, to return the surface gloss to at least 90% of the original surface gloss. The invention further relates to articles made with the multi-layer paneling structure of the invention. The multi-layer structure can be used alone, or can be very thin and used as a replacement for an undercoating and coating on an article, such as a metal car part.

18 Claims, No Drawings

THIN MULTI-LAYER PANELING STRUCTURE

FIELD OF THE INVENTION

The invention relates to a multi-layer paneling structure having a high gloss first layer cap and a second layer of high impact resistance thermoplastic polymer or composites for exterior and interior paneling applications where chemical resistance and/or scratch resistance is desired.

The invention also relates to a high gloss, multi-layer panel that can be easily repaired, once marred, to return the surface gloss to at least 90% of the original surface gloss.

The invention further relates to articles made with the multi-layer paneling structure of the invention. The multi-layer structure can be used alone, or can be very thin and used as a replacement for an undercoating and coating on an article, such as a metal car part.

BACKGROUND OF THE INVENTION

High gloss finishes are appealing, and are desired in many articles, including car interiors and exteriors, as well as in sports equipment, and lawn and garden equipment. One problem with typical gloss coatings and paints, is that the surface gloss layer is easily damaged due to scratching, marring and chemical exposure. Once marred, the thin surface coating is difficult to repair. Additionally, many coatings involve the use of volatile organic solvents which can cause health and/or environmental damage.

Certain structural plastics, such as high impact polystyrene (HIPS), acrylonitrile/butadiene/styrene (ABS) resins, poly(vinyl chloride) (PVC) resins, and the like, exhibit attractive mechanical properties when extruded, molded, or formed into various articles of manufacture. Although these structural plastics are strong, tough and relatively inexpensive, the properties of their exposed surfaces are less than ideal. They are easily degraded by light; can be easily scratched; and are eroded by common solvents.

A common practice in the industry to apply another resinous material over the structural plastic to protect the underlying structural material and provide a surface that can withstand abuse associated with the use environment. Such surfacing materials are called “capstocks”.

The capstock is generally much thinner than the structural plastic, typically being about 10% to about 25% of the total thickness of the composite comprising the capstock and structural plastic plies. For example, the thickness of the capstock can be about 0.01 mm to 0.8 mm, preferably 0.0127 mm to 0.65 mm, and more preferably from 0.04 mm to 0.38 mm whereas the thickness of the structural plastic ply can be about 1.0 to about 10 mm.

As a class, acrylic resins, known for their excellent optical characteristics, resistance to degradation by sunlight, hardness, inertness to water and common chemicals, durability, and toughness, are capstocks of choice for various structural plastics, such as ABS sheet. The mechanical properties of the capstock generally are secondary to those of the structural plastic, but it is important that the capstock not adversely affect the mechanical properties of the composite.

Typical acrylic capstock materials, such as Arkema’s SOLARKOTE® resins are described in U.S. Pat. No. 6,852,405. These capstock materials are generally impact modified. A problem with impact modified single acrylic sheet, is that the impact modification diminishes both the gloss, and the chemical resistance of the cap layer.

Capstocks can be cross-linked to improve chemical resistance, but it is known to be difficult to make cross-linked capstocks thin enough to replace a painted finish.

U.S. Pat. Nos. 5,975,625, and 6,852,405 describes automotive vehicle bodies having a single layer plastic outer body and an inner metal frame.

PROBLEM/SOLUTION

There is a desire for a thin capstock material that has a very high gloss, and has a high impact resistance, where the high gloss resists gloss reduction damage caused by surface contacts with chemicals such as isopropyl alcohol, ethyl alcohol, methyl alcohol, sulphuric acid, phosphoric acid, toluene, isooctane, diisobutylene, and chemical mixtures such as gasoline fuel, diesel fuel, bio-fuel, bitumen, anti-freeze, brake fluid, engine oil, Pancreatin (bird feces substitute), tree resin, and sunscreen. The high gloss finish should also be easily restored to within 10% of the initial surface gloss.

It has surprisingly been found that a thin high gloss surface layer over a high-impact resistance interior layer, can be provided that will minimize the gloss reduction, and enable easy restoration of the high gloss finish to within 10% of the original gloss.

Further advantages of the invention over traditional high gloss paint (used over an undercoating) in automotive applications include reduction of manufacturing steps and elimination of volatile organic solvents associated with coatings.

The multi-layer structure of the invention can pass an 85° C. exposure test, and should be cost competitive with traditional high gloss paint.

Further, while it is difficult to handle and process a typical cross-linked capstock where the cross-linking occurs during the polymerization, a post-polymerization reaction can be used to form useful cross-linking, such as by irradiation such as UV radiation and e-beam radiation.

SUMMARY OF THE INVENTION

In a first aspect, the invention relates to a multi-layer polymer structure comprising a thin, high gloss outer cap layer having a 60° gloss of greater than 80, preferably greater than 85, and more preferably greater than 90, as measured by a BYK Gardner Micro-Tri-Gloss 20/60/85 degree Gloss Meter, wherein said cap layer has a thickness of from 0.01 mm to 0.8 mm, preferably 0.0127 mm to 0.65 mm, and more preferably from 0.04 mm to 0.38 mm; and an internal high impact resistant layer, wherein said high impact layer has an ASTM D256 notched Izod result at 23° C. of greater than 0.8 ft-lb/in, preferably greater than 1.0 ft-lb/in, and more preferably greater than 1.2 ft-lb/in.

In a second aspect, the thin high gloss outer cap layer of the first aspect has a heat deflection temperature (HDT), as measured by ASTM D648 (1.8 MPa) of at least 175° F., when prior to measurement, the samples are annealed at 80° C. for 96 hours then slow-cooled over 4 hours to 23° C.

In a third aspect, the thin, high gloss outer cap layer of any of the first two aspects, contains, as the matrix, at least one acrylic and/or styrenic polymer.

In a fourth aspect, the multi-layer polymer structure of any of the previous aspects, contains, in the thin, high gloss outer cap layer, less than 5 weight percent, preferably less than 3 weight percent, preferably less than 1 weight percent, and most preferably no impact modifiers.

In a fifth aspect, the thin, high gloss outer cap layer of any of the previous aspects is chemical resistant and scratch resistant, and has a gloss retention of over 85%, preferably over 90% and a delta E of less than 5, preferably less than 3 for each test material using the following procedure: for 6×6 inch samples conditioned at 85° C. for one hour and rubbed with ten back-and-forth strokes with a PIG Hazmat pad soaked with a test chemical, then wiped with a clean PIG Hazmat pad, washed, and reconditioned for at least one hour, and 60° gloss re-measured. The test chemicals for the rub are chemicals such as butylene glycol and glyceryl stearate typically found in sunscreens. The cloths used in the test may be 3"×14" PIG Hazmat Pads (MAT302) or 3"×14" PIG Hazmat Pads (MAT423).

In a sixth aspect, the thin, high gloss outer cap layer of any of the previous aspects contains a polymer having a weight average molecular weight of at least 70,000 g/mol.

In a seventh aspect, the internal high impact resistant layer of any of the previous aspects, is a thermoset, thermoplastic, and/or a polymer composite.

In an eighth aspect, the internal high impact resistant layer of any of the previous aspects has as a matrix polymer a thermoplastic selected from the group consisting of acrylonitrile butyl styrene (ABS) polyvinyl chloride (PVC), and high impact polystyrene (HIPS), polycarbonate (PC), a blend of acrylic polymer and polylactic acid, impact modified acrylics, impact modified styrenics, polycarbonate, thermoplastic polyolefin (TPO), polyamides, polyimides, polyesters, polyurethanes, polyolefins and blends thereof.

In a ninth aspect, the high-impact layer of any of the previous aspects is a composite composition containing particles, nanoparticles, and/or fibers.

In a tenth aspect, the composite composition of any of the previous aspects is a fiber-reinforced acrylic composite, said composite formed from a blend of one or more acrylic polymers with one or more acrylic monomers that are impregnated into said fibers, followed by polymerization.

In an eleventh aspect, the multi-layer structure of any of the previous aspects further comprises a tie layer or adhesive layer between the exterior high gloss layer, and interior high impact layer.

In a twelfth aspect, the multi-layer structure of any of the previous aspects exists over a substrate, wherein said substrate is selected from metal; ceramics; and cellulosics; thermoplastic, elastomeric, and thermoset polymers having a thickness in the range 0.1 mm to 30 mm and preferably 1.0 mm to 5 mm.

In a thirteenth aspect, the multi-layer structure of any of the previous aspects comprises two high gloss outer cap layers, one on either side of the internal high impact resistant layer.

In a fourteenth aspect, a method for restoring the gloss on a chemically or physically marred polymer multi-layer structure of any of the previous aspects is presented, where the method includes the step of removing or hiding the mar.

In a fifteenth aspect, the method of aspect 14, involves the mar restoration through the process of buffing, polishing, wiping, chemical treating, and/or sanding said multi-layer structure, wherein said gloss is restored to within 30%, preferably 20%, and most preferably within 10% of the original gloss, as measured by a BYK Gardner Micro-Tri-Gloss 20/60/85 degree Gloss Meter.

In a sixteenth aspect, the multi-layer polymeric structure of any of the previous aspects, is manufactured by thermoforming, in-mold decorating, sequential injection molding, coextrusion, resin transfer molding with in-mold decoration, or 3D printing (additive manufacturing).

In a seventeenth aspect, an article is presented which contains the thin multi-layer polymeric structure of any of the previous aspects, where the article is selected from the group consisting of exterior paneling, automotive body panels, automotive body trim, recreational vehicle body panels or trims, exterior panels for recreational sporting equipment, marine equipment, exterior panels for outdoor lawn, garden and agricultural equipment and exterior paneling for marine, aerospace structures, aircraft, public transportation applications, interior paneling applications, interior automotive trims, interior panels for marine equipment, interior panels for aerospace and aircraft, interior panels for public transportation applications, and paneling for appliances, furniture, and cabinets.

DETAILED DESCRIPTION OF THE INVENTION

"Copolymer" as used herein, means a polymer having two or more different monomer units. "Polymer" is used to mean both homopolymer and copolymers. For example, as used herein, "PMMA" and "polymethyl methacrylate" are used to connote both the homopolymer and copolymers, unless specifically noted otherwise. (Meth)acrylate is used to connote both acrylates and methacrylates, as well as mixtures of these. Polymers may be straight chain, branched, star, comb, block, or any other structure. The polymers may be homogeneous, heterogeneous, and may have a gradient distribution of co-monomer units. All references cited are incorporated herein by reference.

As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble fraction molecular weight after extraction from gel is used.

"Multi-layer" as used herein describes a structure having at least two layers attached directly or indirectly to each other, wherein the exterior layer is a high-gloss capstock, and at least one interior layer is a high impact layer. The layers may be directly in contact with each other, or may contain one or more other layers in between, such as a tie layer, an adhesive layer, a vapor barrier, a color layer or special effects layer, etc. In one embodiment, the multi-layer structure has a high gloss capstock on either side of the interior high impact layer. This arrangement is especially useful where the multilayer structure is transparent or translucent, and the surfaces of both sides would be visible.

Exterior, High Gloss Layer

The exterior high gloss layer is an acrylic- and/or styrenic-based layer; is chemical resistant, mar resistant and scratch resistant, with any deterioration of the high gloss being restorable to within 10% of the original gloss. The 60° gloss of the exterior layer is greater than 80, preferably greater than 85, and more preferably greater than 90, as measured by a BYK Gardner Micro-Tri-Gloss 20/60/85 degree Gloss Meter.

The exterior, high gloss layer may optionally contain 0.01-20 wt % nano-sized particles additives to improve the chemical resistance, mar resistance, scratch resistance, and/or improve the ability of the high gloss surface to be restored after incurring damage from chemical exposure, marring, and/or scratching. Useful nano-sized inorganic fillers include, but are not limited to silica, alumina, zinc oxide, barium oxide, molybdenum disulfide, boron nitride, tungsten disulfide, titanium oxide, nanographene, nanographite, graphite nanoplatelets, and graphite oxide nanoparticles.

The exterior, high gloss layer is thin, having a thickness of from 0.01 mm to 0.8 mm, preferably 0.0127 mm to 0.65 mm, and more preferably from 0.04 mm to 0.38 mm.

The exterior, high gloss layer has a heat deflection temperature (HDT), of greater than 175° F. (or 80° C.) as measured by ASTM D648 (1.8 MPa), when samples are annealed at 60-80° C. for 96 hours then slow-cooled over 4 hours to 23° C.

The acrylic or styrenic polymer of the invention has a weight average molecular weight of between 50,000 and 500,000 g/mol, and preferably from 70,000 and 200,000 g/mol, as measured by gel permeation chromatography. The molecular weight distribution of the acrylic polymer may be monomodal, or multimodal with a polydispersity index greater than 1.5. Copolymers containing comonomers that will lower the HDT of the copolymer, such as $C_{1-6}$ acrylates, should have a weight average molecular weight of greater than 100,000 g/mol. In a preferred embodiment, an acrylic cap layer will contain predominately methyl methacrylate monomer units, and have less than 10 weight percent, and preferably less than 5 weight percent of comonomers. The acrylic capstock may also have comonomers such as methacrylic acid, tertiobutyl cyclohexanol methacrylate, alpha-methyl styrene, and other $T_g$ increasing monomers, where the total co-monomer content can be up to 25%.

In one embodiment the cap layer is a blend of an acrylic or styrenic polymer with up to 90 weight percent, preferably less than 60 weight percent, more preferably less than 35 weight percent % of polyvinylidene fluoride (PVDF) homopolymers or copolymers. A blend of acrylic polymers with less than 30 weight percent, preferably less than 20 weight percent of polylactic acid can also be used. The high gloss acrylic capstock can also be a crosslinked acrylic sheet with less than 5% crosslinking agent.

In one embodiment, the exterior, high-gloss layer may be a polymer blend, containing the acrylic or styrenic polymer plus up to 60 wt %, preferably up to 40 wt % of one or more other compatible, miscible or semi-miscible polymers. One useful blend is a blend of a poly(meth)acrylic polymer or copolymer with acrylonitrile-styrene-acrylate (ASA) polymer.

In one embodiment, crosslinking is provided by a post-polymerization reaction, such as by the use of irradiation. Useful irradiation includes UV radiation, gamma radiation and e-beam. By using a post-polymerization cross-linking mechanism, a thinner cap layer that is easily processable can be achieved.

"Acrylic polymer" as used herein is meant to include polymers, copolymers and terpolymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, n-octyl acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, isodecyl acrylate and methacrylate, tertiobutyl cyclohexyl acrylate and methacrylate, tertiobutyl cyclohexanol methacrylate, trimethyl cyclohexyl acrylate and methacrylate, methoxy polyethylene glycol methacrylate and acrylate with 2-11 ethylene glycol units, penoxyethyl acrylate and methacrylate, alkoxylated phenol acrylate, ethoxylated phenyl acrylate and methacrylate, epoxypropyl methacrylate, tetrahydrofurfuryl acrylate and methacrylate, alkoxylated tetrahydrofurfuryl acrylate, cyclic trimethylolpropane formal acrylate, carprolactone acrylate, dimethylamino ethyl acrylate and methacrylate monomers. Alkyl(meth)acrylic acids such as methacrylic acid and acrylic acid or C1-C8 esters thereof can be useful for the monomer mixture. Alkyl(meth)acrylic acids such as methacrylic acid and acrylic acid can be useful for the monomer mixture. Most preferably the acrylic polymer is a copolymer having 85-99.5 weight percent of methyl methacrylate units and from 0.5 to 15 weight percent of one or more $C_{1-8}$ straight or branched alkyl acrylate units.

Styrenic-based polymers include, but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-butadiene-styrene (MBS) copolymers, styrene-butadiene copolymers, styrene-butadiene-styrene block (SBS) copolymers and their partially or fully hydrogenenated derivatives, styrene-isoprene copolymers, styrene-isoprene-styrene (SIS) block copolymers and their partially or fully hydrogenenated derivatives, and styrene-(meth)acrylate copolymers such as styrene-methyl methacrylate copolymers (S/MMA). A preferred styrenic polymer is ASA. The styrenic polymers of the invention can be manufactured by means known in the art, including emulsion polymerization, solution polymerization, and suspension polymerization. Styrenic copolymers of the invention have a styrene content of at least 10 percent by weight, preferably at least 25 percent by weight.

The capstock should contain less than 15 weight percent impact modifier, preferably less than 5 weight percent, more preferably less than 3 weight percent and most preferably less than 1 weight percent. In one preferred embodiment, the cap layer contains no impact modifier.

Interior High Impact Layer

The thin multi-layer paneling structure of the invention has at least one high impact resistant interior layer. This could be an impact-resistant thermoplastic, a blend of thermoplastics where the blend demonstrates impact-resistance, a blend of one or more thermoplastics and one or more thermoplastic elastomers and/or thermoplastic vulcanizates where the blend demonstrates impact-resistance, a thermoset polymer or a polymer composite. The high impact layer has an ASTM D256 notched Izod result at 23° C. of greater than 0.8 ft-lb/in, preferably greater than 1.0 ft-lb/in, and more preferably greater than 1.2 ft-lb/in.

Useful high impact resistant thermoplastics include, but are not limited to, acrylonitrile butyl styrene (ABS) polyvinyl chloride (PVC), and high impact polystyrene (HIPS), polycarbonate (PC), a blend of acrylic polymer and polylactic acid, impact modified acrylics such as RNEW® from Arkema, impact modified styrenics, polycarbonate, thermoplastic polyolefin (TPO), poly(phenylene oxide), polyphenylene ether, polystyrene polyamides, polyimides, polyesters, polyolefins and blends thereof. Preferred thermoplastics are ABS and polycarbonate.

Useful composites include, but are not limited to, thermoplastic and thermoset resins that are reinforced with particles or nanoparticles including but not limited to graphite, carbon nanotubes, and silica; and/or reinforced with fibers, including but not limited to glass fibers, carbon fibers, and natural fibers. The particles and/or nanoparticles may have a mechanical modulus greater than or less than the continuous phase. The fibers could be in the form of individual fibers, braided fibers, and woven or non-woven mats. Thermoplastic composites include those with a matrix of ABS, PVC, HIPS, acrylic polymers, polyamides, polyurethanes, styrenics, polyether ketone ketone, and polyether ether ketone. Useful thermoset matrices include, but are not limited to polyesters or epoxies.

In one embodiment, a composite is formed using an acrylic liquid resin system containing a blend of acrylic monomer, acrylic polymer and an initiator. The liquid resin system is used to impregnate fibers, followed by polymerization. ELIUM® resins from Arkema are a useful example of such a system.

In one embodiment, the interior high impact resistant polymer is a blend of an acrylic resin and a polyester, such as a polylactic acid.

The thickness of the entire multi-layer structure depends on the final application of that structure, but is typically in the range of 0.1 mm to 30 mm and preferably 1.0 mm to 5 mm.

Manufacturing

The multi-layer structure of the invention may be manufactured by several different means, as known in the art. The structure could be formed by coextrusion, extrusion lamination, extrusion coating, in-mold decoration, sequential injection molding, thermo-forming of a co-extruded sheet or cast sheet, RTM-TS (resin transfer molding with in-mold decoration), and 3D printing (additive manufacturing).

Properties

The thin multi-layer structure of the invention has several properties that make it especially useful in many application.

The high gloss cap has a 60° gloss of greater than 80, preferably greater than 85, and more preferably greater than 90, as measured by a BYK Gardner Micro-Tri-Gloss 20/60/85 degree Gloss Meter.

The high gloss cap is resistant to chemicals, marring, scratching, crazing, and color shift, as well as to gloss reduction. The most significant appearance change after surface chemical exposure for opaque colored samples is gloss reduction, which is used in the current invention to characterize the chemical damage and success of restoration.

The gloss of the high gloss cap can be easily restorable should damage occur. Since the cap layer is thicker than a typical coating, there is additional material to remove in order to restore the surface aesthetic. It can be restored by polishing, which cannot be achieved with a painted surface. Other means to facilitate restoration include, but are not limited to buffing, wiping, chemical treatment, and/or sanding.

The structure could be transparent or translucent, which is not possible for a painted automobile or other type of panel.

Applications/Uses

The multi-layer structure of the invention, because of its excellent gloss, mar and scratch resistance, and the ability to restore the gloss, is an excellent material for use in many applications and articles. These include, but are not limited to internal and exterior paneling, automotive body panels, auto body trim, recreational vehicle body panels or trims, exterior panels for recreational sporting equipment, marine equipment, exterior panels for outdoor lawn, garden and agricultural equipment and exterior paneling for marine, aerospace structures, aircraft, public transportation applications, interior paneling applications, interior automotive trims, interior panels for marine equipment, interior panels for aerospace and aircraft, interior panels for public transportation applications, and paneling for appliances, furniture, and cabinets.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

EXAMPLES

Chemical Resistance Test Method

Chemicals such as butylene glycol and glyceryl stearate typically found in sunscreens are applied to plastic surfaces in this test. The high gloss acrylic capstock surfaces are exposed to sunscreen chemicals at 85° C. for 30 minutes and 24 hours. The detailed test method is as follows: For 6×6 inch samples conditioned at 85° C. for one hour and rubbed with ten back-and-forth strokes with a PIG Hazmat pad soaked with a test chemical, then wiped with a clean PIG Hazmat pad, washed, and reconditioned for at least one hour, and 60° gloss re-measured. The test chemicals for the rub are a mixture of butylene glycol and glyceryl stearate typically found in sunscreens. The cloths used in the test may be 3"×14" PIG Hazmat Pads (MAT302) or 3"×14" PIG Hazmat Pads (MAT423).

After the chemical exposure at the designated temperatures, the samples were cooled down and stabilized at room temperature for an hour before being washed with de-ionized water and wiped clean. The starting surface gloss and final surface gloss are characterized by a BYK Gardner Micro-Tri-Gloss 20/60/85 degree Gloss Meter and the 60° is recorded (measured parallel to the rubbing direction). The measurement unit conforms to the standards DIN 67530, ISO 2813, ASTM D 523 and BS 3900 Part D 5. Values reported are the percentage of surface gloss that is retained after chemical exposure.

Buffing Method

The high gloss acrylic surface is buffed and polished with the following method. Apply tallow and rouge to a cotton muslin buffing wheel. Buff sample for 30-240 seconds with light pressure below the axis of the wheel; enough pressure to let the wheel graze the surface of the sample. Following the buffing step, apply light pressure on sample with a cotton flannel polishing wheel for 10 seconds to further smooth out the surface. After buffing and polishing, clean the acrylic surface with soap and water and dry with cotton cloth.

Scratching Test Method

The high gloss acrylic surface is scratched according to the following method. A 6"×6" injection molded high gloss acrylic plaque is conditioned at 50±5% relative humidity at 23±1° C. for 48 hours. Then, the surface is scratched by a spherical asperity having a radius of curvature of 1±0.1 mm and 15 N scratch load on a Taber multi-finger scratch tester Model 710. The scratching speed is 100±5 mm/s and the length of the scratch is 140 mm.

Paper Polishing Method

Samples exposed to scratching damaged were paper polished within 1 hour after scratching by the following method. A 4"×4" polishing paper (3M™ 281Q Wetordry™ 2 micron polishing paper) was wrapped around a dense sponge. Using light pressure and a circular polishing motion, the scratched acrylic surface was polished by hand with the polishing paper continuously for 5 minutes. After paper polishing the acrylic surface was washed with soap and water and dried with cotton cloth. The 20 surface gloss of a non-scratched region of the plaque was measured before and after paper polishing with a BYK Gardner Micro-Tri-Gloss 20/60/85 degree Gloss Meter as previously described.

Scratch Visibility Analysis

The visibility of scratch damage is quantified by an optical microscopy method. A digital image of the scratched region of the surface is captured in bright-field mode with a Nikon ME600 optical microscope equipped with a Pixelink PL-D 685 color camera at 100× magnification. The image is converted to an RGB color format, where each pixel color is expressed by R, G and B values (integer values 0 to 255) for the Red, Green and Blue components of the pixel color, according to the RGB color system. Then, the R, G and B values are measured for each pixel within two analysis regions of identical size and dimensions, A and B. Region A is entirely contained within the scratched region, and region B is adjacent to Region A and entirely contained within the non-scratched region. Both regions must contain an area greater than 1000 pixels. For each region, the average R, G, and B values of all pixels are calculated. Finally, the Scratch Visibility Value is calculated according to:

$$\text{Scratch Visibility Value} = \left|\left[(R_A + G_A + B_A)/3\right] - \left[(R_B + G_B + B_B)/3\right]\right|$$

Where $R_A$, $G_A$ and $B_A$ are the average Red, Green and Blue color values, respectively, of all pixels in Region A. Likewise, $R_B$, $G_B$ and $B_B$ are the average Red, Green and Blue color values, respectively, of all pixels in Region B. It follows that scratch visibility increases with increasing Scratch Visibility Value.

Example 1 Gloss Restoration after Chemical Exposure Damage

Chemicals such as butylene glycol and glyceryl stearate typically found in sunscreens can cause significant damage to acrylic materials at high temperatures (85° C.), This Example demonstrates the removal of surface damages and/or surface residue and the restoration of surface gloss and color. Table 1 shows the gloss retention before and after 30±10 seconds of buffing. The acrylic materials were exposed to a sunscreen that contains a mixture of butylene glycol and glyceryl stearate as main component at 85° C. for 24 hours before buffing, using the chemical resistance test method described above. After the initial 30±10 seconds of buffing, the surface gloss of the high gloss acrylic capstock can be restored to as high as 80% of the original 60° surface gloss. To restore the high gloss surface to 90% of the original gloss, repeated buffing was carried out as illustrated in Table 2, where 2 minutes of total buffing time can restore the gloss to within 10% of the original gloss.

TABLE 1

Gloss Retention After Chemical Exposure Damage, Before and After 30 ± 10 seconds Buffing (samples are exposed to 85° C. for 24 hours, sunscreen)

| Injection molded | Original Gloss (60°) | After chemical resistance Test, before Buffing | After Buffing |
|---|---|---|---|
| Sample 1 | 90.2 | 10.4% | 70.3% |
| Sample 2 | 89.7 | 39.0% | 80.9% |
| Sample 3 | 87.6 | 26.6% | 72.7% |
| Sample 4 | 91.4 | 32.2% | 58.9% |
| Sample 5 | 86.6 | 4.62% | 58.5% |

Sample 1 = clear PMMA/EA copolymer having an EA comonomer content of 1-10 wt % and a weight average molecular weight in the range of 70,000 to 110,000 g/mol.
Sample 2 = clear PMMA/EA copolymer having an EA comonomer content of 1-10 wt % and a weight average molecular weight in the range of 100,000 to 200,000 g/mol.
Sample 3 = clear PMMA/EA copolymer having an EA comonomer content of 1-10 wt % and a weight average molecular weight in the range of 70,000 to 110,000 g/mol, with 10-35 wt % of impact modifier based on the weight of the PMMA/EA copolymer.
Sample 4 = clear PMMA/EA copolymer having an EA comonomer content of 1-10 wt % and a weight average molecular weight in the range of 70,000 to 110,000 g/mol, with 30-60 wt % of impact modifier based on the weight of the PMMA/EA copolymer.
Sample 5 = black PMMA/EA copolymer having an EA comonomer content of 0.1 to 2.0 wt % and a weight average molecular weight in the range of 70,000 to 110,000 g/mol, with 0.5 to 15 wt % of impact modifier base on the weight of the PMMA/EA copolymer.

TABLE 2

Change in Gloss of Sample 3 with Repeat Buffing

| Total Time (minutes) | Gloss (60°) | Gloss Retention |
|---|---|---|
| 0 | 4.8 | 5.54% |
| 0.5 | 50.3 | 58.1% |
| 1.0 | 64.7 | 74.7% |
| 2.0 | 80.5 | 93.0% |
| 3.0 | 79.6 | 91.9% |
| 4.0 | 80.8 | 93.3% |

Example 2: Chemical Resistance Test

Samples of acrylic capstocks were exposed to sunscreen at 85° C. according to the chemical resistance test method described.

Sample 6 is a black PMMA/EA copolymer having an EA comonomer content of 0.1 to 2.0-wt % and a weight average molecular weight in the range of 70,000 to 110,000 g/mol, Sample 7 is a black PMMA/MAA copolymer (having a MAA comonomer content of 1-10 wt % and a weight average molecular weight in the range of 70,000 to 110,000 g/mol).

Both samples are tested in duplicates, and both samples exhibit more than 90% gloss retention and minimal color change (delta E less than 3), as shown in Table 3.

TABLE 3

| Sample | Initial Gloss (60°) | Gloss After Exposure (60°) | 60° Gloss Retention | Delta E |
|---|---|---|---|---|
| 6 | 86.4 | 90.7 | 104.9% | 2.16 |
| 6 | 86.1 | 92.8 | 107.8% | 2.48 |
| 7 | 87.2 | 85.5 | 98.1% | 0.44 |
| 7 | 87.6 | 85.9 | 98.1% | 0.41 |

Example 3: Surface Restoration after Scratch Damage

Exterior paneling often incurs surface damage due to scratching and abrasion. This example demonstrates the utility of scratch resistant formulations such as those described in WO 18132818 A3 for the exterior layer of high gloss exterior paneling. Also demonstrated is the restoration of a surface after scratching damage via paper polishing. 6"×6" samples plaques were prepared by injection molding and then affixed to steel plates for scratch tests and paper polishing. Samples were subjected to scratching according to the scratching test method described above, and then paper polished according to the paper polishing method described above. The scratch visibility, as well as surface gloss before and after paper polishing are listed in Table 4.

Sample 8 is a black PMMA/EA copolymer having an EA comonomer content of 0.1 to 2.0 wt % and a weight average molecular weight in the range of 70,000 to 110,000 g/mol.

Sample 9 is the same as Sample 8, with the addition of 15 wt % of Cabot CAB-O-SIL® TS622 fumed silica. Sample 9 was prepared by melt compounding the black PMMA/EA copolymer and Cabot CAB-O-SIL® TS622 fumed silica on a 27 mm Leistritz ZSE-27HP twin-screw extruder.

The initial gloss of Sample 8 and Sample 9 were above 85 points for 60° gloss and above 78 points for 20° gloss, despite the presence of nanoparticle reinforcement in Sample 9. After scratching, the scratch visibility of Sample 8 (38.1) was significantly greater than Sample 9 (5.6). Visually, the scratch visibility of Sample 8 also appeared more severe than Sample 9. After paper polishing, the gloss of both Sample 8 and 9 reduced, however the gloss retention of sample 9 (98%) was greater than sample 8 (76%). The scratch visibility after paper polishing reduced for both samples, with the greatest reduction for sample 8. Sample 8 demonstrated relatively low 20° gloss retention after paper polishing (76%). Sample 9 demonstrated the useful combination of high initial gloss, low scratch visibility both before and after paper polishing, as well as excellent (98%) 20° gloss retention after paper polishing.

| Sample ID | Initial Gloss (20°/60°) | Gloss after Paper Polishing (20°/60°) | 20° Gloss Retention | Scratch Visibility Value Before Paper Polishing | Scratch Visibility Value After Paper Polishing |
|---|---|---|---|---|---|
| Sample 8 | 79.9/86.5 | 60.4/78.9 | 76% | 38.1 | 4.7 |
| Sample 9 | 78.3/85.2 | 76.4/83.4 | 98% | 5.6 | 3.2 |

With low heat buildup colorants such as IR reflective pigments or IR transmitting organic dyes, the heat buildup (temperature rise of plastic above ambient) of dark acrylic capstocks can be reduced as much as 30° F. (determined using ASTM D4803). Accordingly, the service temperature of exterior paneling with IR reflective pigments or IR transmitting organic dyes will be much lower than the service temperature of exterior paneling without IR reflective pigments nor IR transmitting organic dyes. The lower service temperature may improve chemical resistance by reducing the thermodynamic free energy of mixing between the polymeric exterior paneling and the chemical to which the polymer substrate is exposed. It follows that the lower service temperature may significantly reduce the penetration of chemicals into the exterior paneling, defer the potential degradation caused by these chemicals, and reduces the temperature differences between the layers within the exterior paneling, which may be a multilayer structure, to minimize the possibility of a delamination failure within the exterior paneling. Lower service temperature may also reduce the temperature difference between the exterior paneling and any supporting material to which the exterior panel may be adhered, such as metal, to minimize the possibility of delamination failure of the adhesive interface.

What is claimed is:

1. A multi-layer polymer structure comprising:

a. a thin, high gloss outer cap layer, having a 60° gloss of greater than 80, as measured by a BYK Gardner Micro-Tri-Gloss 20/60/85 degree Gloss Meter, wherein said thin, high gloss outer cap layer comprises an acrylic polymer and/or a styrenic polymer; has a thickness of from 0.01 mm to 0.8 mm; and is restorable to within 10% of original said 60° gloss by polishing; and b. an internal high impact resistant layer, wherein said high impact resistant layer has an ASTM D256 notched Izod result at 23° C. of greater than 0.8 ft-lb/in, wherein said internal high impact resistant layer, comprises a thermoplastic selected from the group consisting of acrylonitrile butyl styrene (ABS) polyvinyl chloride (PVC), and high impact polystyrene (HIPS), polycarbonate (PC), a blend of acrylic polymer and polylactic acid, impact modified acrylics, impact modified styrenics, thermoplastic polyolefin (TPO), polyamides, polyimides, polyurethanes, polyesters, polyolefins and blends thereof, wherein said multi-layer structure has a thickness of 0.1 mm to 30 mm.

2. The multi-layer polymer structure of claim 1, wherein said thin, high gloss outer cap layer has a heat deflection temperature (HDT), as measured by ASTM D648 (1.8 MPa) of at least 175° F., when prior to measurement, samples are annealed at 80° C. for 96 hours then slow-cooled over 4 hours to 23° C.

3. The multi-layer polymer structure of claim 1, wherein said thin, high gloss outer cap layer contains less than 5 weight percent impact modifiers.

4. The multi-layer polymer structure of claim 1, wherein said thin, high-gloss outer cap layer further comprises 0.01-20 weight percent nanoparticles.

5. The multi-layer polymer structure of claim 4, wherein said nanoparticles are selected from the group consisting of silica, alumina, zinc oxide, barium oxide, molybdenum disulfide, boron nitride, tungsten disulfide, titanium oxide, Nanographene, nanographite, graphite nanoplatelets, and graphite oxide nanoparticles.

6. The multi-layer polymer structure of claim 1, wherein said thin, high gloss outer cap layer is chemical resistant and scratch resistant, having a gloss retention of over 90% and a delta E of less than 3 for each test material according to following procedure: for 6×6 inch samples conditioned at 85° C. for one hour and rubbed with ten back-and-forth strokes with each test material then wiped, washed, and reconditioned for at least one hour, and 60° gloss re-measured, the test materials for the rub being done with butylene glycol and glyceryl stearate; soaked into a cloth that is a 3"×14" PIG Hazmat Pad (MAT302).

7. The multi-layer polymer structure of claim 1, wherein the polymer of said thin, high gloss outer cap layer has a weight average molecular weight of at least 70,000 g/mol.

8. The multi-layer polymer structure of claim 1, wherein said internal high-impact resistant layer is a composite composition containing particles, nanoparticles, and/or fibers.

9. The multi-layer polymer structure of claim 8, wherein said composite composition is a fiber-reinforced acrylic composite, said composite formed from a blend of one or more acrylic polymers with one or more acrylic monomers that are impregnated into said fibers, followed by polymerization.

10. The multi-layer polymer structure of claim 1, wherein said structure further comprises a tie layer or adhesive layer between the thin, high gloss outer cap layer, and interior high-impact resistant layer.

11. The multi-layer polymer structure of claim 1, wherein said multi-layer polymer structure is over a substrate, wherein said substrate is selected from the group consisting of metal; ceramics; cellulosics; thermoplastic, elastomeric, and thermoset polymers having a thickness in a range of 0.1 mm to 30 mm.

12. The multi-layer polymer structure of claim 1, wherein said structure comprises two high gloss outer cap layers, one on either side of the internal high impact resistant layer.

13. The multi-layer polymer structure of claim 1, wherein said thin, high gloss outer cap layer has a thickness of from 0.0127 mm to 0.65 mm.

14. The multi-layer polymer structure of claim 1, wherein the polymer of said thin, high gloss outer cap layer has a weight average molecular weight of between 70,000 and 200,000 g/mol.

15. The multi-layer polymer structure of claim 1, wherein said acrylic polymer comprises a copolymer of 85-99.5 weight percent methyl methacrylate units and 0.5-15 weight percent of one or more $C_{1-8}$ straight or branched alkyl acrylate units.

16. The multi-layer polymer structure of claim 1, wherein said internal high impact resistant layer comprises a thermoplastic selected from the group consisting of acrylonitrile butyl styrene (ABS) and polycarbonate (PC).

17. A method for restoring the gloss on a chemically or physically marred multi-layer polymer structure of claim 1, wherein said method includes a step of removing or hiding the mar through a process of buffing, polishing, wiping, chemical treating, and/or sanding said multi-layer structure, wherein said gloss is restored to within 10% of the original gloss, as measured by a BYK Gardner Micro-Tri-Gloss 20/60/85 degree Gloss Meter.

18. An article comprising a multi-layer polymeric structure of claim 1, wherein said article is selected from the group consisting of exterior paneling, automotive body panels, autobody trim, recreational vehicle body panels or trims, exterior panels for recreational sporting equipment, marine equipment, exterior panels for outdoor lawn, garden and agricultural equipment and exterior paneling for marine, aerospace structures, aircraft, public transportation applications, interior paneling applications, interior automotive trims, interior panels for marine equipment, interior panels for aerospace and aircraft, interior panels for public transportation applications, and paneling for appliances, furniture, and cabinets.

* * * * *